US008528295B2

(12) United States Patent
Glynn et al.

(10) Patent No.: US 8,528,295 B2
(45) Date of Patent: Sep. 10, 2013

(54) SERVICEABLE TRIM PANEL WITH INTEGRAL FASTENER

(75) Inventors: Jerrold Scott Glynn, Grass Lake, MI (US); James D. Biebel, Milford, MI (US); James Lewis Aleksa, Livonia, MI (US)

(73) Assignee: Johnson Controls Technology Company, Holland, MI (US)

( * ) Notice: Subject to any disclaimer, the term of this patent is extended or adjusted under 35 U.S.C. 154(b) by 289 days.

(21) Appl. No.: 12/634,244

(22) Filed: Dec. 9, 2009

(65) Prior Publication Data

US 2011/0131918 A1 Jun. 9, 2011

(51) Int. Cl.
*E04C 2/38* (2006.01)
(52) U.S. Cl.
USPC .................................. 52/718.01; 24/295
(58) Field of Classification Search
USPC .............. 52/511, 718.01, 716.7; 24/289, 24/458, 292, 293, 295, 297; 296/146.7
See application file for complete search history.

(56) References Cited

U.S. PATENT DOCUMENTS

| 4,688,761 | A | 8/1987 | Wilcox | |
|---|---|---|---|---|
| 4,861,208 | A | 8/1989 | Boundy | |
| 5,341,544 | A | 8/1994 | Richter et al. | |
| 6,671,934 | B2 | 1/2004 | Wenzlick et al. | |
| 7,159,926 | B2 | 1/2007 | Ward et al. | |
| 7,178,855 | B2 | 2/2007 | Catron et al. | |
| 7,725,991 | B2 * | 6/2010 | Lubera et al. | 24/295 |
| 7,784,159 | B2 * | 8/2010 | Dickinson et al. | 24/295 |
| 2002/0194710 | A1 * | 12/2002 | Dickinson et al. | 24/295 |
| 2010/0088860 | A1 * | 4/2010 | Benedetti et al. | 24/297 |
| 2010/0107372 | A1 * | 5/2010 | Reznar | 24/292 |

* cited by examiner

*Primary Examiner* — Jessica Laux
(74) *Attorney, Agent, or Firm* — Dickinson Wright PLLC

(57) ABSTRACT

A re-usable vehicle trim component (20) for attaching to a support member (38), such as a passenger seat, includes a trim panel (22) and a fastener (24) integral with the trim panel (22). A base (26) is coupled to the trim panel (22) by dog house walls (46). A pair of shafts (28) extend transversely from the base (26), a cross beam (30) extends between the shafts (28), and an elastically flexible return arm (32) extends from the cross beam (30) toward the base (26) to a distal end (68). A catch (34) extends outwardly from the return arm (32). The return arm (32) deflects as the fastener (24) is inserted into an aperture (36) of the support member (38). The support member (38) is secured between the catch (34) and the base (26). The trim component (20) can be removed and re-installed without damage.

17 Claims, 4 Drawing Sheets

SERVICEABLE TRIM PANEL WITH INTEGRAL FASTENER

BACKGROUND OF THE INVENTION

1. Field of the Invention

The present invention relates to trim components and particularly to fasteners for attaching a trim panel to a support member.

2. Description of the Prior Art

Fasteners for attaching trim panels to support members are commonly used in the automotive industry. The fastener attaches the trim panel, such as an attractive or decorative plastic panel, to a support member, such as the frame of a passenger seat, door, or another section of the vehicle body. The trim panel may cover a section of the vehicle body and the mechanical parts disposed along the vehicle body. In one example, the trim panel is attached to the frame of a passenger seat to cover the electric motor driving the seat recliner. Oftentimes, the trim panel and fastener are removed for servicing the support member or parts covered by the trim panel. For example, the trim panel and fastener are removed from the passenger seat to service the electric motor covered by the trim panel.

The fasteners may include a variety of different designs. Many fasteners include a two-piece design, such as a pin and grommet, or a plastic pin with a spring steel "A-clip," such as those manufactured by Johnson Controls. Other fasteners are formed integral with the trim panel. The integral fastener may include a base, a cantilevered arm extending transversely from the base, and a catch extending from the cantilevered arm. The cantilevered arm is inserted into an aperture of the support member and the support member is secured along the cantilevered arm between the catch and the base. The integral fastener performs about equal to the A-clip fastener and requires about the same amount of force to insert and remove. The integral fastener also provides cost savings on material, installation equipment, and installation labor, compared to the two-piece fasteners.

Unfortunately, existing integral fasteners are damaged during servicing. The integral fastener including the cantilevered arm fails upon removal from the support member. The cantilevered arm of the fastener typically experiences irreversible damage, such as a crack or permanent bend in the horizontal direction, adjacent the catch. Therefore, a new trim panel and integral fastener must be used every time the integral fastener is removed from the support member.

SUMMARY OF THE INVENTION

The subject invention provides a re-useable trim component for attaching to a support member. The trim component includes a trim panel and a fastener integral with and extending transversely from the trim panel. The fastener of the trim component includes a base coupled to the trim panel and a pair of shafts spaced from one another and extending transversely from the base. The fastener includes a cross beam extending between the shafts. The fastener also includes an elastically deflectable return arm extending from the cross beam toward the base to a distal end. The fastener includes a catch extending outwardly from the return arm. In another embodiment, the invention provides a fastener which can be securely attached to a trim panel to form a trim component including a trim panel and integral fastener.

The trim component is attached to the support member by inserting the cross beam, shafts, return arm, and catch into an aperture of the support member until the support member is secured between the base and the catch. The cross beam supports the return arm during the insertion and while the trim component is attached to the support member. The cross beam also supports the return arm during removal of the trim component from the support member. The trim component is inserted into, removed from, and re-inserted into the aperture of the support member without failure. The trim component also maintains sufficient performance upon removal and re-installation into the support member.

The trim component is typically inserted, removed, and re-installed (i.e. serviced) about five to seven times before experiencing irreversible damage, such as a crack or permanent bend in the return arm. Thus, the trim component can be re-used numerous times to provide significant cost savings, compared to the integral trim panel and fastener of the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
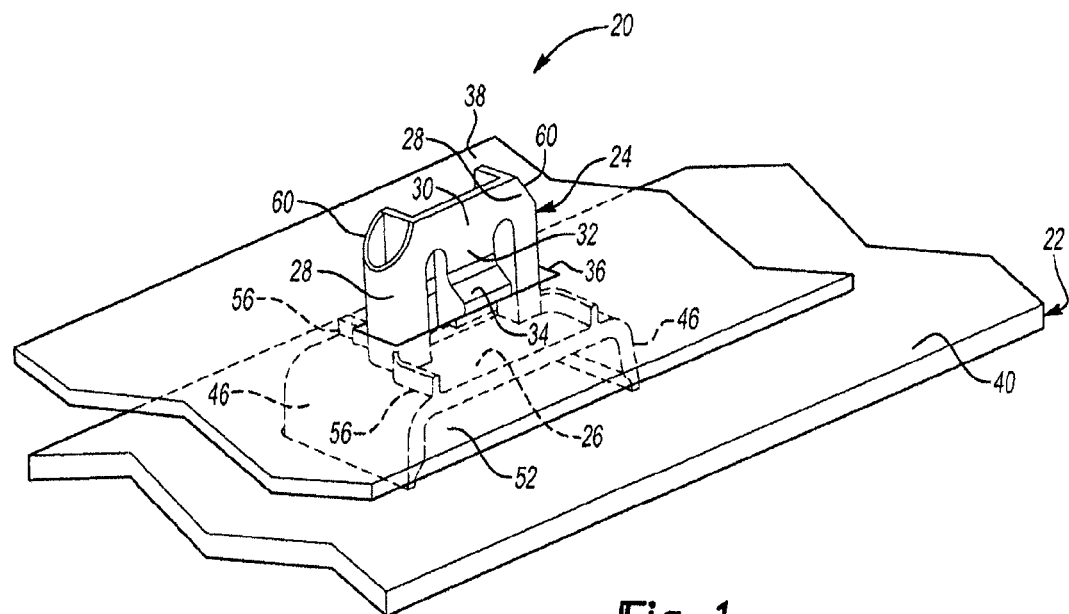
FIG. 1 is an enlarged perspective view of a vehicle trim component installed in a support member.

Referring to FIGS. 1-5, a trim component 20 for an interior passenger compartment of a vehicle is generally shown. The trim component 20 includes a trim panel 22 and a fastener 24 integral with the trim panel 22. The fastener 24 includes a base 26, a pair of tubular shafts 28 extending from the base 26, a cross beam 30 interconnecting the shafts 28, a return arm 32 extending from the cross beam 30 toward the base 26, and a catch 34 extending from the return arm 32. The fastener 24 of the trim component 20 is inserted into an aperture 36 of a support member 38, such as a side panel of a passenger seat or a vehicle door. The cross beam 30 of the fastener 24 is inserted into the aperture 36 of the support member 38, followed by the shafts 28, return arm 32, and catch 34. The support member 38 is disposed between the catch 34 and the base 26. The fastener 24 is releasably attached to the support member 38 so that the trim component 20 can be removed from the support member 38 and later re-inserted into the aperture 36 of the support member 38.

Figure 2:
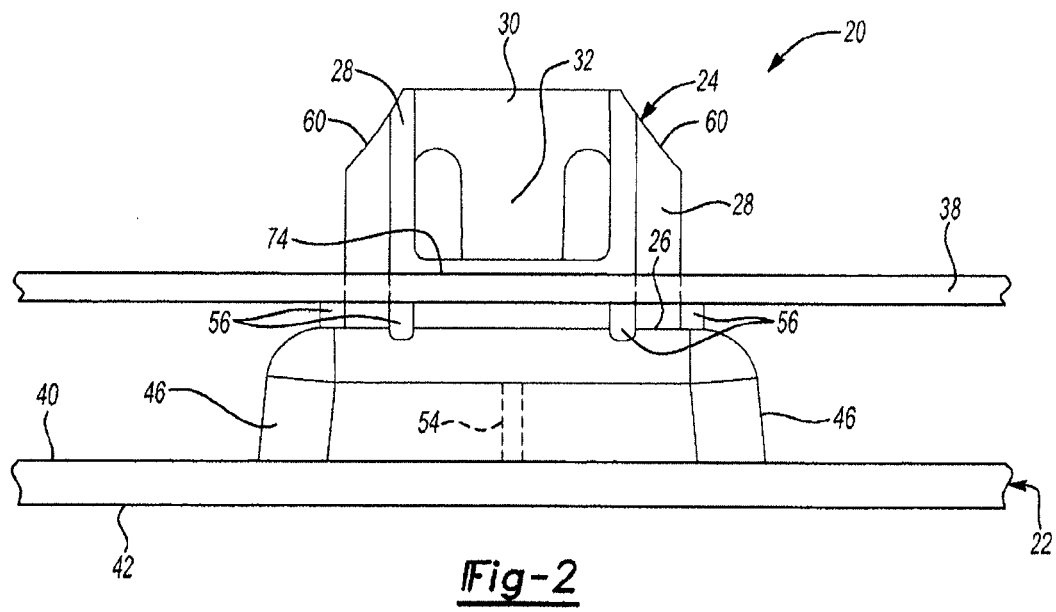
FIG. 2 is a side view of the trim component installed in the support member.
Figure 3:
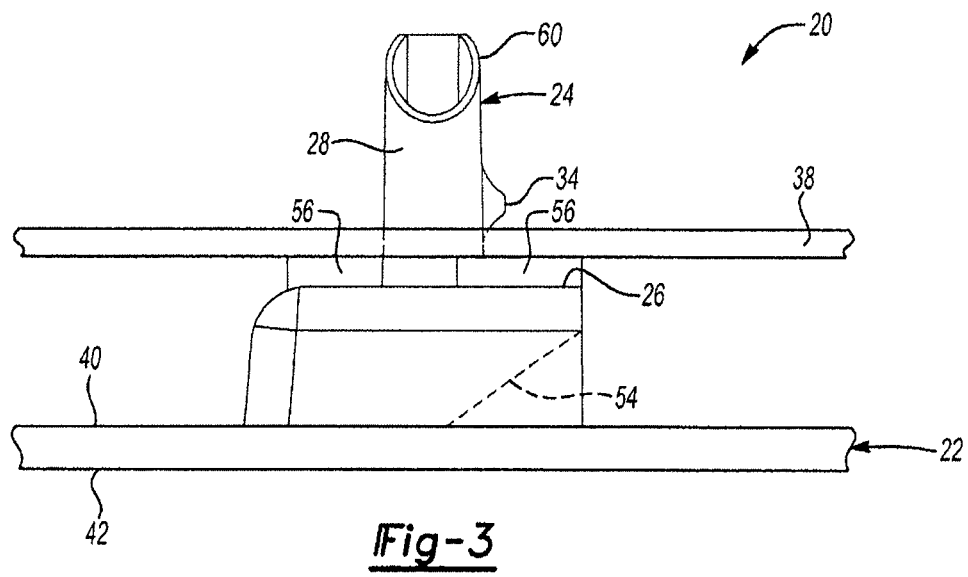
FIG. 3 is another side view of the trim component installed in the support member.
Figure 5:
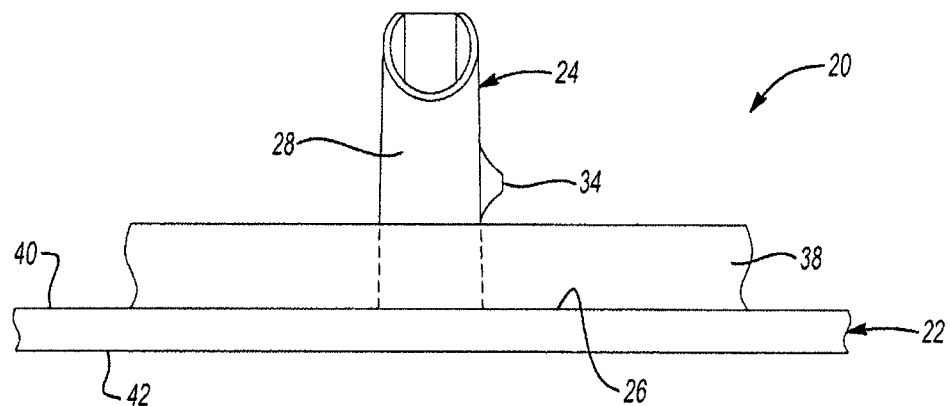
FIG. 5 is a side view of the trim component without a dog house feature.

As shown in FIGS. 2, 3 and 5, the trim panel 22 presents an interior surface 40 and an oppositely facing exterior surface 42. The exterior surface 42 is exposed to the passenger compartment of the vehicle and therefore typically includes a decorative or aesthetically appealing design. The exterior surface 42 may include a variety of colors and patterns. However, the entire trim component 20 is typically formed of a single color. An additional layer of material, such as a decorative fabric, may be molded or otherwise secured to the exterior surface 42 and exposed to the passenger compartment. The exterior surface 42 typically includes a smooth surface and a planar cross section, as shown in FIGS. 2, 3 and 5, however the exterior surface 42 may include a rough surface or non-planar cross section.

The interior surface 40 of the trim panel 22 faces opposite the exterior surface 42 and toward the support member 38. For example, the interior surface 40 may face toward a body of the passenger seat or vehicle door. The interior surface 40 typically includes a smooth surface and planar cross section, as shown in FIGS. 2, 3 and 5, however the interior surface 40 may also include a rough surface or non-planar cross section.

The fastener 24 of the trim component 20 is typically formed integral with the trim panel 22 during a single molding process. The fastener 24 and trim panel 22 are typically formed of a thermoplastic material, preferably a medium impact polypropylene copolymer resin having a density of about 0.900 g/cm$^3$ at 23° C., tested using the ASTM D 792B method. However, the material of the trim component 20 is not limited to polypropylene or thermoplastics. The trim component 20 may be formed of other materials, and the fastener 24 and the trim panel 22 may be formed of materials different from one another. The trim panel 22 and the integral fastener 24 are preferably formed by injection molding, but may be formed by other processes. Further, the fastener 24 and trim panel 22 may be formed of materials different from one another, molded separate from one another, and then subsequently welded or otherwise secured to one another.

Figure 4:
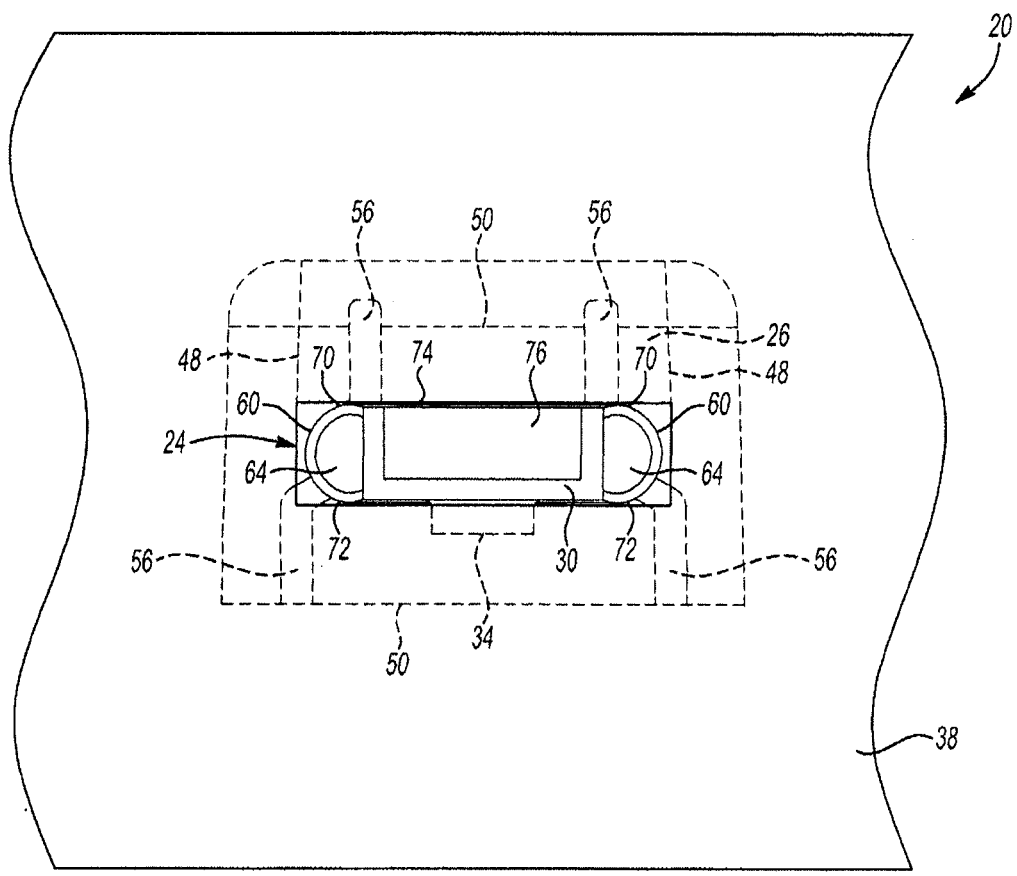
FIG. 4 is a bottom view of the trim component.

The fastener 24 extends transversely from the trim panel 22 and typically includes a "dog house" feature, wherein the base 26 is spaced from the trim panel 22 and coupled to the interior surface 40 of the trim panel 22 by dog house walls 46, as shown in FIG. 1. The base 26 typically includes a planar cross section 44, a pair of side edges 48, and a pair of end edges 50 interconnecting the side edges 48 to define a rectangular shape. The edges 48, 50 of the base 26 may define other shapes, such as a round or asymmetric shape. The dog house walls 46 extend continuously between the interior surface 40 of the trim panel 22 and the side edges 48 and one of the end edges 50 of the base 26 to define a dog house opening 52 along the other end edge 50 between the base 26 and the interior surface 40 of the trim panel 22. The dog house walls 46 may include a variety of shapes, and may include rounded corners between the side edges 48 and end edge 50 of the base 26, as shown in FIG. 4. In one embodiment, the base 26 and the dog house walls 46 include a thickness of about 7.0 μM to about 10.0 μm. However, the base 26 and dog house feature can include a variety of dimensions, depending on the application of the trim component 20. For example, the dog house walls 46 may be longer or shorter depending on the desired amount of space between the trim panel 22 and the support member 38. The dog house feature may include a reinforcement wall 54 extending from the base 26 to the interior surface 40 of the trim panel 22 to reinforce the trim panel 22, as shown in FIGS. 2 and 3.

As shown in FIG. 5, the trim component 20 may be formed without the dog house feature. In this embodiment, base 26 of the fastener 24 is formed integral with the interior surface 40 of the trim panel 22, and the support member 38 is disposed against the interior surface 40 of the trim panel 22.

As shown in FIGS. 1-4, the trim component 20 may include ribs 56 extending transversely from the base 26 opposite the dog house feature. Each of the ribs 56 typically extends along the base 26 between rib ends. The ribs 56 may assist in aligning the fastener 24 of the trim component 20 in a desired position relative to the support member 38 upon inserting the fastener 24 into the aperture 36 at an angle. The ribs 56 also maintain the trim component 20 in place relative to the support member 38. In other words, the support member 38 may be secured between the catch 34 and the ribs 56. The length of the ribs 56 varies depending on the thickness of the support member 38. One of the rib ends of each of the ribs 56 may be coupled to one of the shafts 28.

As alluded to above, the pair of shafts 28 extend transversely from the base 26 and away from the trim panel 22. The shafts 28 are spaced from one another and each extend from the base 26 to a shaft end 60. Each shaft 28 typically defines a hollow interior and presents a shaft opening 64 at the corresponding the shaft end 60, as shown in FIG. 4. The hollow interior reduces the weight of the trim component 20. The shafts 28 are also hollow on the interior to maintain a relatively consistent wall thickness. A consistent wall thickness is preferred for injection molded components. The pair of shafts 28 function to locate and protect the cross beam 30, the return arm 32, and the catch 34 from damage during use. Each shaft 28 may include a generally cylindrical shape with one flat side facing the other shaft 28. In one embodiment, the shafts 28 include a diameter of about 10 μm. The shafts ends 60 may be chamfered, as shown in FIGS. 1-3, for providing a smooth insertion of the shafts 28 into the aperture 36 of the support member 38. However, the shafts 28 may comprise a variety of other shapes and dimensions, depending on the application of the trim component 20. Each of the shafts 28 have a first side 70 and a second side 72 facing opposite one another. A shaft wall 74 typically extends continuously between the first sides 70 of the shafts 28 along the base 26 to reinforce the shafts 28. The shaft wall 74 also prevents overstressing of the return arm 32 during use of the trim component 20, such as during installation or removal of the trim component 20 from the aperture 36 of the support member 38.

The cross beam 30 of the trim component 20 extends between and interconnects the shaft ends 60, as shown in FIGS. 1 and 2. In one embodiment, the cross beam 30 includes a rectangular shape, about 4.0 mm in length and about 2.0 mm in thickness. The cross beam 30 extends between the second sides 72 of the shafts 28 to present a deflection space 76 between the cross beam 30 and the shaft wall 74, as shown in FIG. 4.

Figure 6:
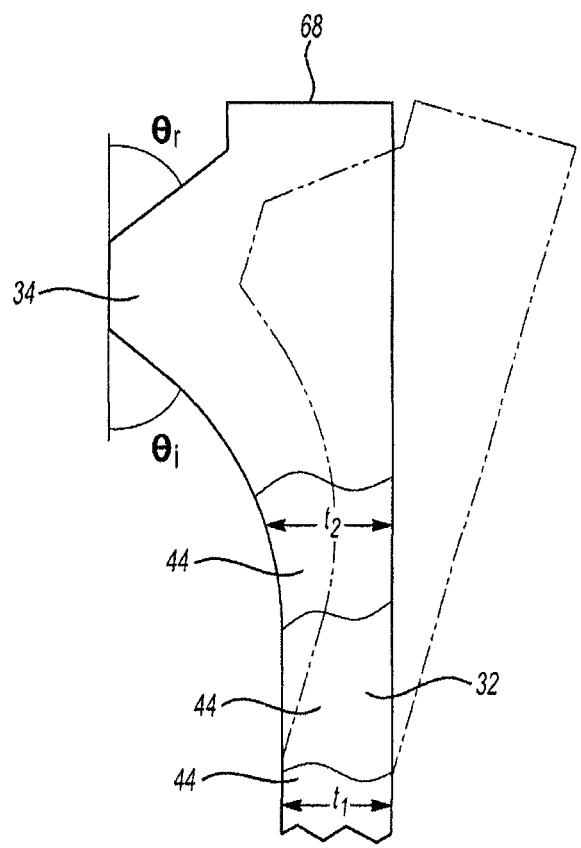
FIG. 6 is an enlarged view of the return arm and catch of the trim component in an initial position and a deflected position.

The fastener 24 includes the elastically deflectable return arm 32 extending transversely from the cross beam 30 toward the base 26 and to a distal end 68. In an initial position, the return arm 32 extends parallel to the shafts 28, and the distal end 68 of the return arm 32 is spaced from the base 26. The return arm 32 typically includes a thickness about equal to the thickness of the cross beam 30. As the fastener 24 is inserted into the aperture 36 of the support member 38, the return arm 32 deflects into the deflection space 76, toward the shaft wall 74. The return arm 32 may deflect or bend at an angle of about 11.0 degrees to about 17.0 degrees, toward the shaft wall 74, and typically about 14.0 degrees. FIG. 6 shows the return arm 32 in the initial position and in a deflected position. The deflection of the return arm 32 is elastic, so once the support member 38 passes by the catch 34, the return arm 32 returns to the initial position, parallel to the shafts 28. The return arm 32 may be inserted, removed, and re-inserted into the aperture 36 of the support member 38 (i.e. "serviced") numerous times without failure or damage. Typically, the fastener 24 is inserted, removed, and re-installed (serviced) about five to seven times before the return arm 32 experiences wear or failure adjacent the catch 34.

As alluded to above, the catch 34 of the fastener 24 extends outwardly from the return arm 32 opposite the deflection space 76. The catch 34 is disposed adjacent the distal end 68 of the return arm 32 and spaced from the cross beam 30, as shown in FIGS. 1, 3, 4, 5, and 6. The catch 34 and the return arm 32 define an insertion angle $\theta_i$ as shown in FIG. 6, facing away from the base 26. The insertion angle $\theta_i$ is preferably about 45.0 degrees, but may be adjusted depending on the material properties and specific application of the trim component 20. The catch 34 and the return arm 32 also define a return angle $\theta_r$, as shown in FIG. 6, facing toward the base 26. The return angle $\theta_r$ is preferably about 52.0 degrees, and may also be adjusted depending on the material properties and specific application of the trim component 20. In one embodiment, the catch 34 includes a curved profile in the longitudinal direction between the cross beam 30 and the distal end 68 of the return arm 32. The catch 34 keeps the trim component 20 in a stable position relative to the support member 38. In other words, the support member 38 is securely disposed between the catch 34 and the ribs 56 or the base 26 of the fastener 24.

As stated above, the fastener 24 of the trim component 20 preferably has a density of about 0.9 g/cm³ at 23° C., tested using the ASTM D 792B method, however the trim component 20 can have other densities, depending on the material and specific application of the trim component 20. The dimensions of the trim component 20 are also adjusted depending on the material properties and specific application of the trim component 20. In one embodiment, the return arm 32 of the fastener 24 includes a plurality of sections 44, wherein each section 44 has a dimension, such as a thickness, different from one another. For example, a first one of the sections 44 of the return arm 32, adjacent the cross beam 30, has a first thickness $t_1$, a second one of the sections 44 of the return arm 32, adjacent the catch 34, has a second thickness $t_2$, and the first thickness $t_1$ is less than the second thickness $t_2$. The first thickness $t_1$ of the first section 44 may also be less than the thickness of the cross beam 30. The lower dimension of the first section 44 adjacent the cross beam 30 allows the return arm 32 to elastically deflect toward the shaft wall 74. Further, the greater dimension of the second section 44 adjacent the catch 34 provides support to the catch 34.

Figure 7:
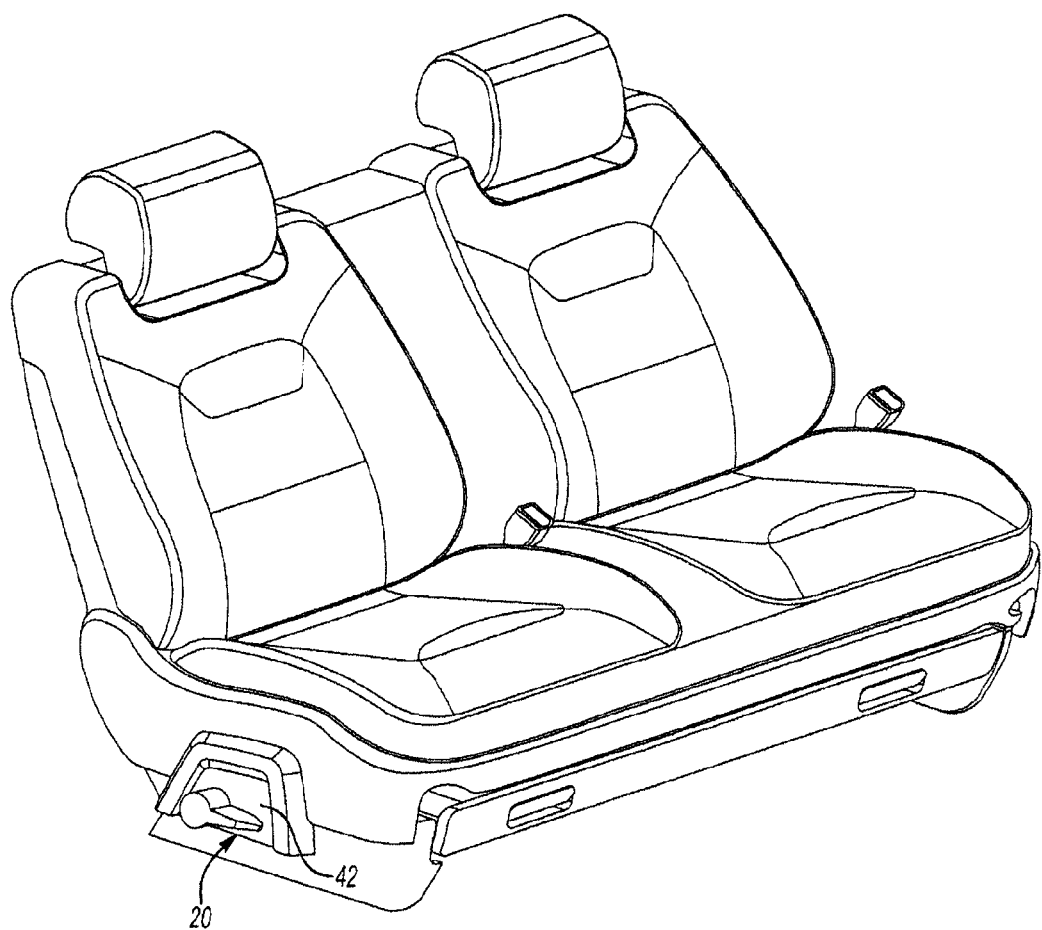
FIG. 7 is a perspective view of a vehicle seat including the trim component.

As stated above, the trim component 20 is attached to the support member 38, such as the frame of a passenger seat, as shown in FIG. 7. Additionally or alternatively, the support member 38 may comprise a side door panel, center console, or another section of the vehicle body. The trim component 20 is typically installed by first inserting the cross beam 30 and shaft ends 60 of the fastener 24 into the aperture 36 of the support member 38. The fastener 24 is typically inserted into the aperture 36 at an angle, and the support member 38 slides from the shaft ends 60, along the return arm 32, and past the catch 34. Once the support member 38 passes over the catch 34, the support member 38 is securely maintained between the catch 34 and the ribs 56 or the base 26, as shown in FIGS. 1, 2, 3, and 5. The base 26 and trim panel 22 are again aligned parallel to the support member 38. The trim panel 22 typically provides an aesthetically appealing cover, over the support member 38 and other parts disposed along the support member 38. The trim component 20 may be removed from the aperture 36 of the support member 38 for various reasons, such as to service the support member 38 or vehicle parts covered by the trim panel 22. A variety of servicing tools may be used to remove the trim component 20 from the support member 38. The trim component 20 can be re-attached to the support member 38 after servicing the support member 38 or vehicle parts.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

The invention claimed is:

1. A trim component (20) for attaching to a support member (38) comprising:
   a trim panel (22); and
   a fastener (24) integrally molded to and extending transversely from said trim panel (22); wherein said fastener (24) includes:
   a base (26),
   a pair of generally tubular shafts (28) spaced from one another and each having a first side (70) and a second side (72) facing opposite one another and extending transversely from said base (26) to a shaft end (60),
   said first sides (70) of said shafts (28) presenting a deflection space (76) therebetween at said shaft ends (60),
   each of said tubular shafts (28) defining a hollow interior extending from said base (26) to said shaft end (60),
   a cross beam (30) extending between said second sides (72) of said tubular shafts (28),
   a return arm (32) extending and parallel to said shafts (28) and perpendicular to said base (26) from said cross beam (30) toward said base (26) to a distal end (68),
   a catch (34) extending outwardly from said return arm (32), and
   said return arm (32) being elastically deflectable.

2. A trim component (20) as set forth in claim 1 wherein said catch (34) and said return arm (32) define a return angle ($\theta_r$) facing said base (26).

3. A trim component (20) as set forth in claim 2 wherein said return angle ($\theta_r$) is about 52.0 degrees.

4. A trim component (20) as set forth in claim 1 wherein said catch (34) and said return arm (32) define an insertion angle ($\theta_i$) facing said cross beam (30).

5. A trim component (20) as set forth in claim 4 wherein said insertion angle ($\theta_i$) is about 45.0 degrees.

6. A trim component (20) as set forth in claim 1 wherein said fastener (24) includes a density of about 0.900 g/cm³ at 23° C.

7. A trim component (20) as set forth in claim 1 wherein said return arm (32) includes a plurality of sections (44) having dimensions different from one another.

8. A trim component (20) as set forth in claim 7 wherein a first one of said sections (44) of said return arm (32) adjacent said cross beam (30) has a dimension less than a second one of said sections (44) of said return arm (32) adjacent said catch (34).

9. A trim component (20) as set forth in claim 1 wherein said fastener (24) includes a shaft wall (74) extending parallel to said return arm (32) between said first sides (70) of said tubular shafts (28) along said base (26) for supporting said tubular shafts (28).

10. A trim component (20) as set forth in claim 9 wherein said cross beam (30) is longitudinally spaced from said shaft wall (74) along said tubular shafts (28) to present the deflection space (76) between said cross beam (30) and said shaft wall (74) for allowing said return arm (32) to deflect toward said shaft wall (74).

11. A trim component (20) as set forth in claim 1 wherein said catch (34) is spaced from said cross beam (30) by said return arm (32) and is disposed adjacent said distal end (68) of said return arm (32).

12. A trim component (20) as set forth in claim 1 wherein said catch (34) includes a curved profile in the longitudinal direction.

13. A trim component (20) as set forth in claim 1 wherein said fastener (24) includes a plurality of ribs (56) extending transversely from said base (26).

14. A trim component (20) as set forth in claim 1 wherein said base (26) is spaced from said trim panel (22); and
said fastener (24) includes dog house walls (46) extending transversely from said trim panel (22) and coupling said base (26) to said trim panel (22).

15. A trim component (20) as set forth in claim 14 wherein said base (26) includes a pair of side edges (48) interconnected by a pair of end edges (50) to define a rectangular shape; and
said dog house walls (46) extend from said trim panel (22) to said side edges (48) and one of said end edges (50) of said base (26) to define a dog house opening (52) along one of said side edges (48) between said base (26) and said trim panel (22).

16. A trim component (20) as set forth in claim 1 wherein said return arm (32) includes a first section (44) spacing said catch (34) from said cross beam (30), said first section (44) and said catch (34) each have a thickness (t) extending parallel to said base (26), and said thickness (t) of said catch (34) is greater than said thickness (t) of said first section (44).

17. A trim component (20) for attaching to a support member (38) produced by a single injection molding process and comprising:
a trim panel (22);
a fastener (24) extending transversely from said trim panel (22) and integrally molded to said trim panel (22), wherein said fastener (24) includes:
a base (26),
a plurality of dog house walls (46) extending transversely from said trim panel (22) and coupling said base (26) to said trim panel (22),
said base (26) being parallel to said trim panel (22) and having a dimension less than said trim panel (22),
a pair of generally tubular shafts (28) spaced from and parallel to one another and extending transversely from and perpendicular to said base (26),
each of said tubular shafts (28) having a first side (70) and a second side (72) facing opposite one another and extending from said base (26) to a shaft end (60),
said first sides (70) of said shafts (28) presenting a deflection space (76) therebetween at said shaft ends (60),
each of said tubular shafts (28) defining a hollow interior extending from said base (26) to said shaft end (60),
a cross beam (30) extending between said second sides (72) of said tubular shafts (28),
a return arm (32) extending parallel to said shafts (28) and perpendicular to said base (26) from said cross beam (30) toward said base (26) to a distal end (68) spaced from said base (26),
a catch (34) extending outwardly from said return arm (32),
said return arm (32) including a first section (44) spacing said catch (34) from said cross beam (30),
said first section (44) and said catch (34) each having a thickness (t) extending parallel to said base (26),
said thickness (t) of said catch (34) being greater than said thickness (t) of said first section (44), and
said return arm (32) being elastically deflectable.

* * * * *